US 7,603,348 B2

(12) United States Patent
He et al.

(10) Patent No.: US 7,603,348 B2
(45) Date of Patent: Oct. 13, 2009

(54) SYSTEM FOR CLASSIFYING A SEARCH QUERY

(75) Inventors: Xiaofei He, Glendale, CA (US); Pradhuman Dasharalhasinh Jhala, Glendale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 385 days.

(21) Appl. No.: 11/698,408

(22) Filed: Jan. 26, 2007

(65) Prior Publication Data
US 2008/0183685 A1 Jul. 31, 2008

(51) Int. Cl.
*G06F 17/30* (2006.01)
(52) U.S. Cl. .................... 707/4; 707/2; 707/3
(58) Field of Classification Search ............ 707/5, 707/6, 2, 3, 4, E17.014
See application file for complete search history.

(56) References Cited

U.S. PATENT DOCUMENTS

| | | | | |
|---|---|---|---|---|
| 5,625,767 | A * | 4/1997 | Bartell et al. | 345/440 |
| 6,233,575 | B1 * | 5/2001 | Agrawal et al. | 707/6 |
| 6,687,696 | B2 * | 2/2004 | Hofmann et al. | 707/6 |
| 7,051,017 | B2 * | 5/2006 | Marchisio | 707/3 |
| 7,266,559 | B2 * | 9/2007 | Cook et al. | 707/100 |
| 7,328,216 | B2 * | 2/2008 | Hofmann et al. | 707/100 |
| 2002/0107853 | A1 * | 8/2002 | Hofmann et al. | 707/7 |
| 2004/0111419 | A1 * | 6/2004 | Cook et al. | 707/100 |
| 2004/0249796 | A1 * | 12/2004 | Azzam | 705/3 |
| 2005/0021357 | A1 * | 1/2005 | Schuetze et al. | 705/1 |
| 2005/0216448 | A1 * | 9/2005 | Talib et al. | 707/3 |
| 2005/0234879 | A1 * | 10/2005 | Zeng et al. | 707/3 |
| 2006/0167896 | A1 * | 7/2006 | Kapur et al. | 707/10 |
| 2007/0011110 | A1 * | 1/2007 | Selvaraj et al. | 706/12 |
| 2007/0203940 | A1 * | 8/2007 | Wang et al. | 707/103 R |
| 2007/0214115 | A1 * | 9/2007 | Liu et al. | 707/3 |
| 2007/0214131 | A1 * | 9/2007 | Cucerzan et al. | 707/5 |
| 2007/0239734 | A1 * | 10/2007 | Arellanes et al. | 707/10 |
| 2008/0004864 | A1 * | 1/2008 | Gabrilovich et al. | 704/9 |
| 2008/0059508 | A1 * | 3/2008 | Lu et al. | 707/102 |
| 2008/0065624 | A1 * | 3/2008 | Sun et al. | 707/5 |
| 2008/0109285 | A1 * | 5/2008 | Reuther et al. | 705/7 |
| 2008/0126280 | A1 * | 5/2008 | Liu et al. | 706/20 |

OTHER PUBLICATIONS

Brahmi, Abderrezak, et al., "Regularized Classifiers for Information Retrieval", AI 2005, LNCS 3501, Springer-Verlag, Berlin, Germany, May 3, 2005, pp. 427-431.*
Wang, Fei, et al., "Semi-Supervised Classification Using Linear Neighborhood Propagation", CVPR '06, Jun. 17-22, 2006, pp. 160-167.*

(Continued)

*Primary Examiner*—Robert Stevens
(74) *Attorney, Agent, or Firm*—Brinks Hofer Gilson & Lione; James L. Katz; Nathan O. Greene (57) ABSTRACT

A system is described for classifying a search query. The system may create a machine learning classifier function that may be "trained" by a plurality of categorized queries within a query taxonomy. The system may represent the queries as term vectors and input the term vectors to the machine learning classifier function to generate a value that may correspond to a particular category within the query taxonomy. The system may regularize the machine learning classifier function based on user search click data to improve the classifying accuracy.

21 Claims, 8 Drawing Sheets

OTHER PUBLICATIONS

Lu, Yumao, et al., "Coupling Feature Selection and Machine Learning Methods for Navigational Query Identification", CIKM '06, Arlington, VA, Nov. 5-11, 2006, pp. 682-689.*

Diaz, Fernando, et al., "When Less is More: Relevance Feedback Falls Short and Term Expansion Succeeds at HARD 2005", TREC 2005, © 2005, pp. 1-6.*

Wang, Jiao, et al., "Semi-Supervised Classification with Active Query Selection", SSPR&SPR 2006, LNCS 4109, Springer-Verlag, Berlin, Germany, Aug. 9, 2006, pp. 741-746.*

DeCoste, Dennis, et al., "Fast Query-Optimized Kernel Machine Classification Via Incremental Approximate Nearest Support Vectors", ICML-2003, Washington, DC, © 2003, pp. 115-122.*

Shimosaka, Masamichi, et al., "Efficient Margin-Based Query Learning on Action Classification", Proc. of the 2006 IEEE/RSJ International Conf. on Intelligent Robots and Systems, Beijing, China, Oct. 9-15, 2006, pp. 2778-2784.*

Sun, Yijun, et al., "Two New Regularized AdaBoost Algorithms", International Conf. on Machine Learning and Applications, Louisville, KY, Dec. 16-18, 2004, pp. 1-7.*

Jones, Rosie, et al., "Generating Query Substitutions", WWW 2006, Edinburgh, Scotland, May 23-26, 2006, pp. 387-396.*

Belkin, M., et al., "Laplacian Eigenmaps and Spectral Techniques for Embedding and Clustering," In T. G. Dietterich, S. Becker, and Z. Ghahramani, editors, Advances in Neural Information Processing Systems 14, Cambridge, MA, 2001. MIT Press, 7 pages (Dec. 2001).

Belkin, M., et al., "On Manifold Regularization," Technical Report TR-2004-05, Department of Computer Science, The University of Chicago, 12 pages (Jun. 2004).

Billerbeck, B., et al., "Query Expansion using Associated Queries," *CIKM '03*, New Orleans, Louisiana, USA, 8 pages (Nov. 3-8, 2003).

Carpineto, C., et al., "An Information-Theoretic Approach to Automatic Query Expansion," 19(1) *ACM Transactions on Information Systems* 1-27 (Jan. 2001).

Chung, Fan, "Spectral Graph Theory," book based on CMBS Workshop in Jun. 1994, 25 pages (Sep. 1996).

Cui, H, et al., "Query Expansion by Mining User Logs," 15(4) *IEEE Transactions on Knowledge and Data Engineering* 829-839 (Jul./Aug. 2003).

He, X., et al., "Face Recognition Using Laplacianfaces," 27(3) *IEEE Transactions on Pattern Analysis and Machine Intelligence* 1-13 (Mar. 2005).

Ng, A, et al., "On Spectral Clustering: Analysis and an algorithm," In T. G. Dietterich, S. Becker, and Z. Ghahramani, editors, Advances in Neural Information Processing Systems 14, Cambridge, MA, 2001. MIT Press, 8 pages (Dec. 2001).

Pednault, E.P.D., "Statistical Learning Theory," MIT Encyclopedia of the Cognitive Sciences, 5 pages (1998).

Shi, J., et al., "Normalized Cuts and Image Segmentation," 22(8) *IEEE Transactions on Pattern Analysis and Machine Intelligence* 888-905 (Aug. 2000).

Theobald, M, et al., "Efficient and Self-tuning Incremental Query Expansion for Top-k Query Processing," *SIGIR'05*, Salvador, Brazil, 8 pages (Aug. 15-19, 2005).

Wen, J., et al., "Query Clustering Using User Logs," 20(1) *ACM Transactions on Information Systems* 59-81 (Jan. 2002).

Yang, Yiming, "An Evaluation of Statistical Approaches to Text Categorization," *Information Retrieval 1*, 69-90 (1999).

Zhou, D., et al., "Learning with Local and Global Consistency," In S. Thrun, L. K. Saul, and B. Scholkopf, editors, Advances in Neural Information Processing Systems 16, Cambridge, MA, 2003. MIT Press, 8 pages (Dec. 2003).

\* cited by examiner

| Query | Top 15 Web Pages |
|---|---|
| 400 ↘<br>Apple Juice | www.applejuice.org<br>www.thenandnow.net/fanlisting/applejuice<br>en.wikipedia.org/wiki/Apple_juice<br>www.appleproducts.org/recipes.html<br>importer.alibaba.com/buyeroffers/Apple_Juice.html<br>www.applejuice.org/recipes.html<br>www.martinellis.com<br>www.martinellis.com/Products/50oz_Unfiltered_AppleJuice.htm<br>www.webtender.com/db/ingred/461<br>www.appleproducts.org/nutritn.html<br>www.drinksmixer.com/desc68.html<br>www.soymilkquick.com/applejuice.html<br>www.ichef.com/recipe.cfm?task=display&itemid=71667&recipeid=71330<br>www.hormel.com/kitchen/glossary.asp?id=36065&catitemid=<br>www.amazon.com/exec/obidos/tg/detail/-/B00000K41T?v=glance |
| 402 ↘<br>Apple Computer | www.apple.com<br>store.apple.com<br>www.apple.com/support<br>en.wikipedia.org/wiki/Apple_Computer<br>quicktime.apple.com<br>asia.apple.com<br>www.info.apple.com<br>developer.apple.com<br>jobs.apple.com/cgi-bin/WebObjects/Employment.woa<br>store.apple.com/Catalog/US/Images/routingpage.html<br>asu.info.apple.com<br>www.apple.co.jp<br>www.appleclub.com.hk<br>www.apple-history.com<br>finance.yahoo.com/q?s=AAPL |

SYSTEM FOR CLASSIFYING A SEARCH QUERY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Technical Field

The disclosed embodiments relate to a data processing system for classifying a search query.

2. Related Art

Computer users may request information by formulating a search query and submitting the search query to an Internet search engine, intranet search engine, personal search engine, or mobile search engine, etc., collectively referred to as a search engine. In response thereto, the search engine may retrieve information from a database, index, catalog, etc. or directly from the Internet or intranet, that it deems relevant based on the search query and display this information to the user. Generally, the search engine locates the information by matching the key words contained within the search query with an index of stored information relating to a large number of information sources, such as web pages, available via the network, e.g. the Internet or an intranet, etc. or database files available via a personal computer or mobile device, etc. The search engine may display the resultant information as a list of the best-matching information, web pages, or database files to the user. It would be desirable, however, to have a system operable to classify a search query to better understand the context and/or intent of the search query.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

By way of introduction, information sought by a user from a search engine, i.e. the intent of the search query, may not always be readily determinable from the user's query and/or context surrounding the query. The difficulties in understanding the query may stem from the fact that queries often comprise very little information, e.g. a query typically has less than three terms. By automatically associating a category label, herein referred to as a category index number, to the query, its meaning, e.g. context information and/or user intent of the query, may be better understood. The category index numbers may improve a variety of network applications, e.g. web search, web-based advertising, recommendation systems, etc. For example, the category index numbers may be used by web search applications and/or recommendation systems to identify similar and/or related queries that may provide a user with additional and/or alternative search results, shortcuts, or other information to help focus, expand, or diversify the user's searching. The category labels may also be used by a web-based advertiser or advertising search engine to offer the user more relevant and/or diverse advertisements.

The disclosed embodiments provide a system 100 for classifying a search query. The system 100 analyzes a plurality of queries that are manually and/or automatically categorized within a query taxonomy. The system 100 submits the queries, or a subset thereof, to a search engine and identifies one or more of the top returned web pages to represent the queries. One or more of the terms in the web pages are extracted and combined to form one or more term vectors that provide context to the query. The term vectors may be combined to represent the queries as points in a high dimensional vector space. The system 100 uses the term vectors and manual categorizations as training data to "train" a machine learning classifier function that can automatically associate an uncategorized query with a category within the taxonomy. The system 100 may incorporate a regularizer in order to avoid or limit the effects of overfitting that may occur during the training.

Figure 1:
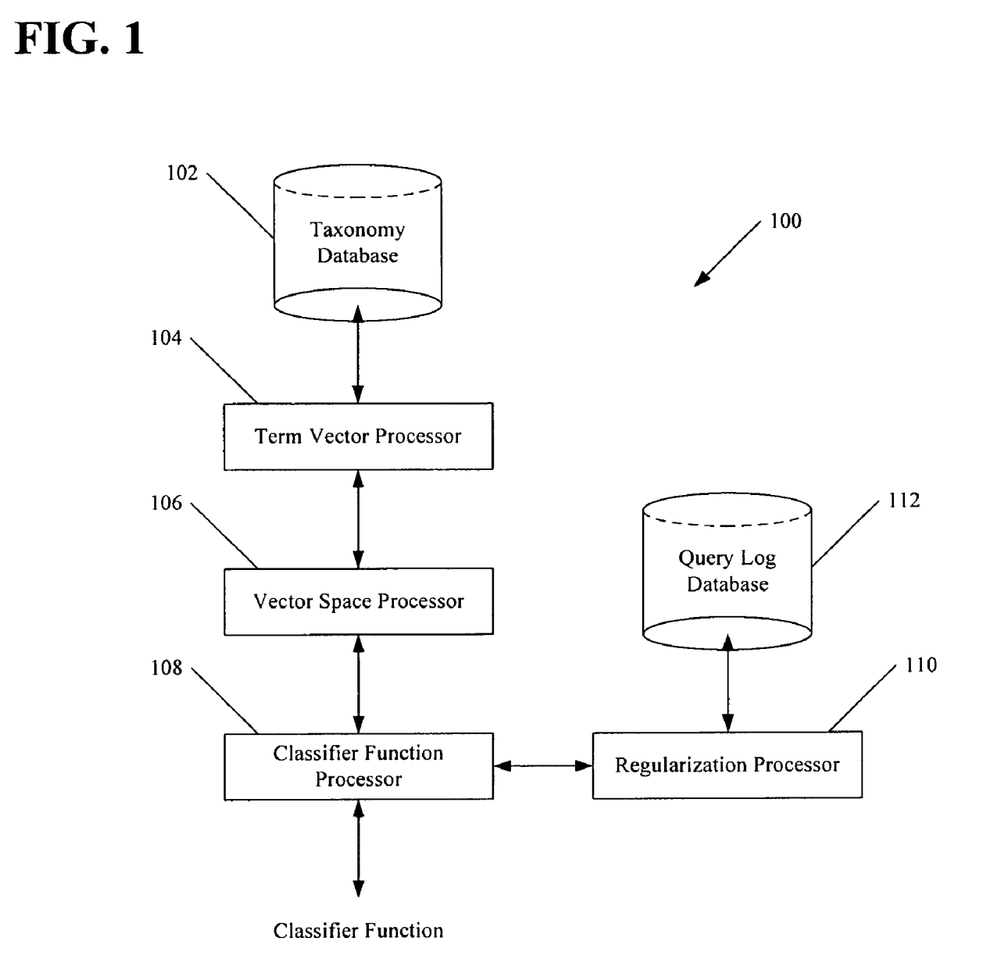
FIG. 1 is a block diagram of an exemplary system for classifying a search query.

A system 100 for classifying a search query according to one embodiment is shown in FIG. 1. As shown, the system 100 includes a taxonomy database 102, a term vector processor 104 coupled with the taxonomy database 102, a vector space processor 106 coupled with the term vector processor 104, a classifier function processor 108 coupled with the vector space processor 106, a regularization processor 110 coupled with the classifier function processor 108, and a query log database 112 coupled with the regularization processor 110. Herein, the phrase "coupled with" is defined to mean directly connected to or indirectly connected through one or more intermediate components. Such intermediate components may include both hardware and software based components. Each of the processors may be implemented in software, hardware, or a combination thereof and one or more of the processors may be integrated together or further subdivided into additional discrete components. The embodiments disclosed herein may be implemented in one or more computer programs executing on one or more programmable systems comprising at least one processor and at least one data storage system. The computer program may include programming logic stored in a memory and executable by a processor coupled with the memory. Each such program may be implemented in any desired computer language to communicate with a computer system.

The taxonomy database 102 includes one or more databases and/or servers that contain a manually and/or automatically created taxonomy of query classification categories. The taxonomy may contain different levels of hierarchy that may be divided at any level of granularity. Each level of hierarchy may contain one or more categories defined to classify the queries, such as by subject-matter. The categories may be divided at any level of granularity within the levels of hierarchy. For example, a first level of hierarchy may contain general categories, such as entertainment, travel, sports, etc., followed by subsequent levels of hierarchy that contain categories that increase in specificity in relation to the increasing levels of hierarchy. In the same example, a second level hierarchy may contain the category "music," a third level hierarchy may contain the category "genre," a fourth level hierarchy may contain the category "band," a fifth level hierarchy may contain the category "albums," a sixth level hierarchy may contain the category "songs," etc.

Figure 2:
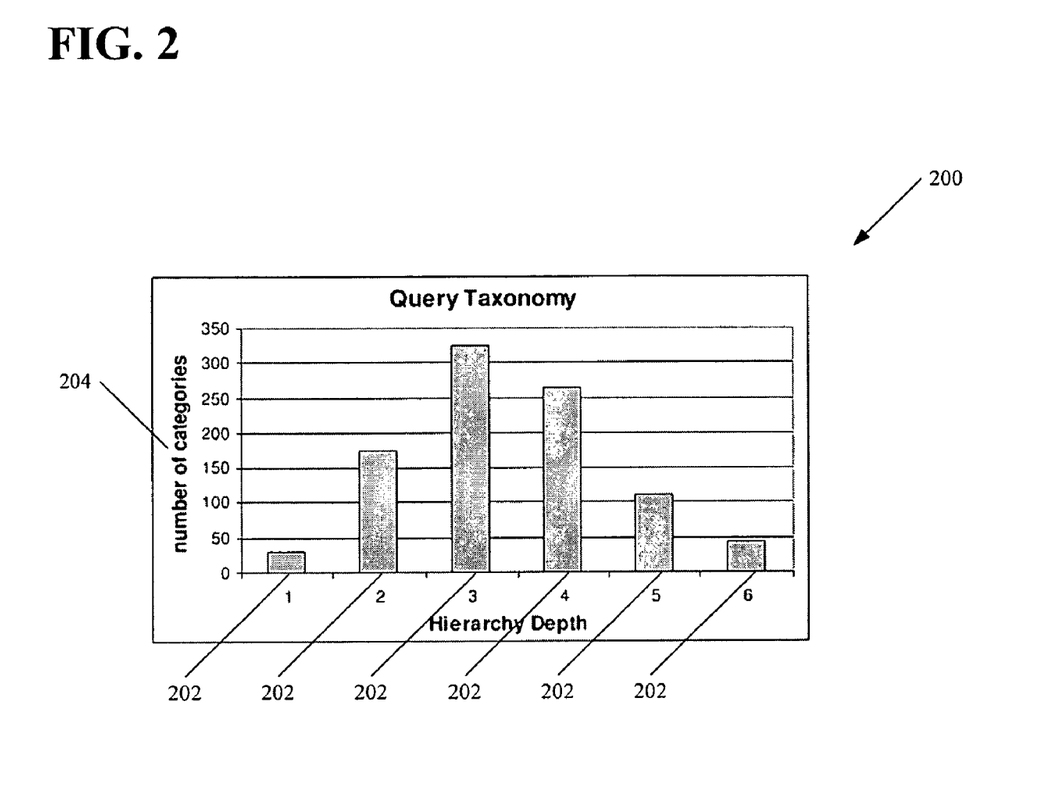
FIG. 2 is a table showing an exemplary search query taxonomy.

Each category within the taxonomy is provided with a category index number that may be used by the system 100 to identify the category and the corresponding queries that are associated with the category. FIG. 2 shows an exemplary taxonomy 200 that may be used to classify queries. The taxonomy 200 has six levels of hierarchy 202. The six levels of hierarchy contain 31, 175, 324, 265, 111, and 43 (204) classification categories, respectively. The taxonomy 200 may contain any number of queries within the categories. As will be described below, the machine learning function may be "trained" by training data, i.e. inputs associated with target outputs, in order to predict the classification of un-categorized queries. The training data includes manually and/or automatically categorized queries in the taxonomy that are stored in the taxonomy database 102.

Figure 3:
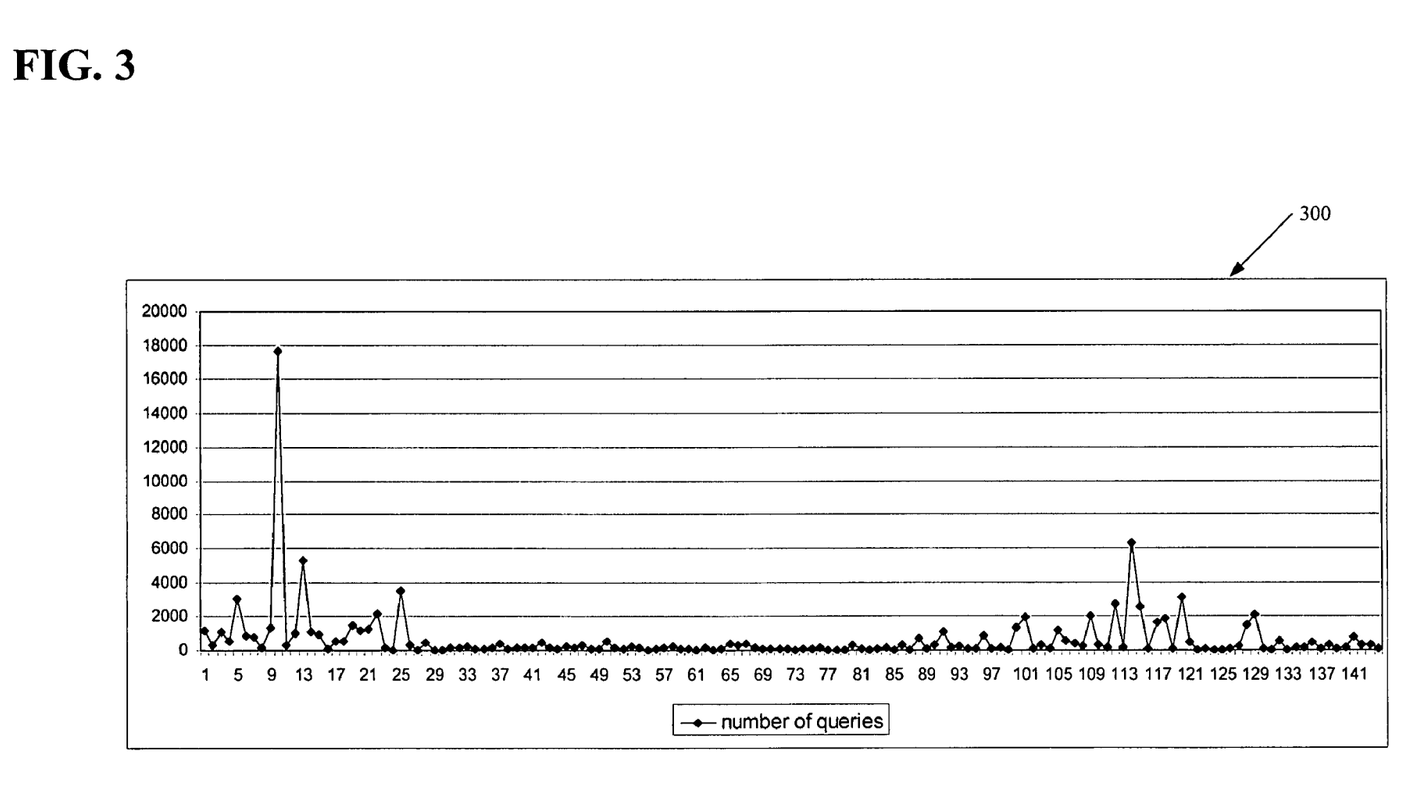
FIG. 3 is a graph showing an exemplary query distribution within the search query taxonomy shown in FIG. 2.

FIG. 3 shows an exemplary query distribution 300 for the second level of hierarchy categories shown in FIG. 2. In the example of FIG. 3, the categories that contain less than twenty queries are removed. As shown, the query distribution 300 contains 94,415 manually categorized queries in 144 categories. As will be described below, these manually categorized queries may be used as the training data for the machine learning function. The number of queries selected as training data may vary. For example, the taxonomy database 102 may store 94,415 manually categorized queries as shown in FIG. 3, although a lesser or greater number of queries may be used depending on the amount of training data required to produce a machine learning function that yields a desired accuracy output.

The manually categorized queries may be selected randomly, or may be selected based on a criterion such as the frequency in which the query is submitted to one or more search engines. For example, the training data may consist of queries that have a search frequency exceeding a particular threshold. The search frequency may be determined by log data generated and tracked by the search engines. Other criterion for selecting the training data may also be used, such as query variety, query specificity, query length, etc.

The term vector processor 104 is coupled with the taxonomy database 102 and computes term vectors for the manually categorized queries stored in the taxonomy database 102. The term vectors provide expanded query representations that may better describe the meaning of the query, e.g. provide context and/or intent to the query. The term vector processor 104 may compute term vectors for the manually and/or automatically categorized queries stored in the taxonomy database 102. The term vector processor 104 may also compute term vectors in real time for user submitted un-categorized queries.

To compute the term vectors, the term vector processor 104 identifies a query in the taxonomy database 102, or receives a user submitted query, and submits the query to a search engine. Any search engine, e.g. an Internet search engine, intranet search engine, personal search engine, mobile search engine, or other information retrieval system may be used. In response to the query, the search engine returns a number of web pages as search results. The term vector processor 104 selects any number of web pages to represent the query. It is assumed that at least the top returned web pages are relevant to the query. For example, the term vector processor 104 may submit query q to a search engine and select the top n web pages, represented as $p_1, p_2, \ldots, p_n$. In one example, n is equal to fifteen, although other values may be used by the term vector processor 104.

The term vector processor 104 extracts the terms from each $p_i$, where $i=1, \ldots, n$. The term vector processor 104 may filter unwanted terms and/or symbols, numbers, etc. to improve the amount of noise contained within the term vectors. For example, the term vector processor 104 may filter "soft" terms, i.e. terms that provide no meaning and/or context to the query, such as articles, prepositions, conjunctions, etc., e.g. "the", "a", "with", "of", etc. The "soft" terms may be identified in a look-up dictionary, such that when a "soft" term is extracted that matches one of the terms in the dictionary, it may be filtered by the term vector processor 104.

The term vector processor 104 may also perform morphological tests, e.g. tests based on grammatical and other variants of words that are derived from the same root or stem, to determine whether two terms are duplicates. For example, the term filter processor 104 may perform an edit distance, i.e. Levenshtein distance, test to compute the total number of characters that two terms have in common. If two terms share a large number of characters in common, the two terms may be considered duplicates. The edit distance test may be a good indicator of whether spelling variations exist between terms that are otherwise identical.

The term vector processor 104 may also perform canonicalization, e.g. remove prefixes, suffixes, plural designations, etc. to convert a term that has one or more possible representations into a "standard" canonical representation. Based on the standard representations of the terms, the term vector processor 104 may remove duplicate terms and/or unwanted symbols, numbers, etc. The term vector processor 104 may perform other morphological tests to identify duplicate terms.

Based on the extracted terms, the term vector processor 104 computes the term frequencies for each $p_i$. The term vector processor 104 may filter terms with frequencies that fall below a threshold. Each $p_i$ may therefore be represented as a term vector based on the term and the frequency in which the term occurs on the web page. The term vector processor 104 may normalize the term vectors. The normalization may prevent bias towards longer web pages that may have higher term frequencies regardless of the actual importance of the terms in the web page. The normalization may therefore give a measure of the importance of the terms within the particular web pages. The normalization may be computed by determining a scale factor for each $p_i$, e.g. by scaling the sum of the term frequencies of each $p_i$ to a convenient value, e.g. 1, or by scaling the largest term frequency of each $p_i$ to a convenient value, e.g. 1. The normalization may also be computed by dividing the term frequencies by the total term frequency for each $p_i$.

In one embodiment, the term vector processor 104 sums the term vectors for each $p_i$, as follows:

$$p = \sum_{i=1}^{n} p_i. \quad (1)$$

In one embodiment, the term vector processor 104 represents the query q by the following vector:

$$q = \frac{p}{\|p\|}. \quad (2)$$

Figure 4:
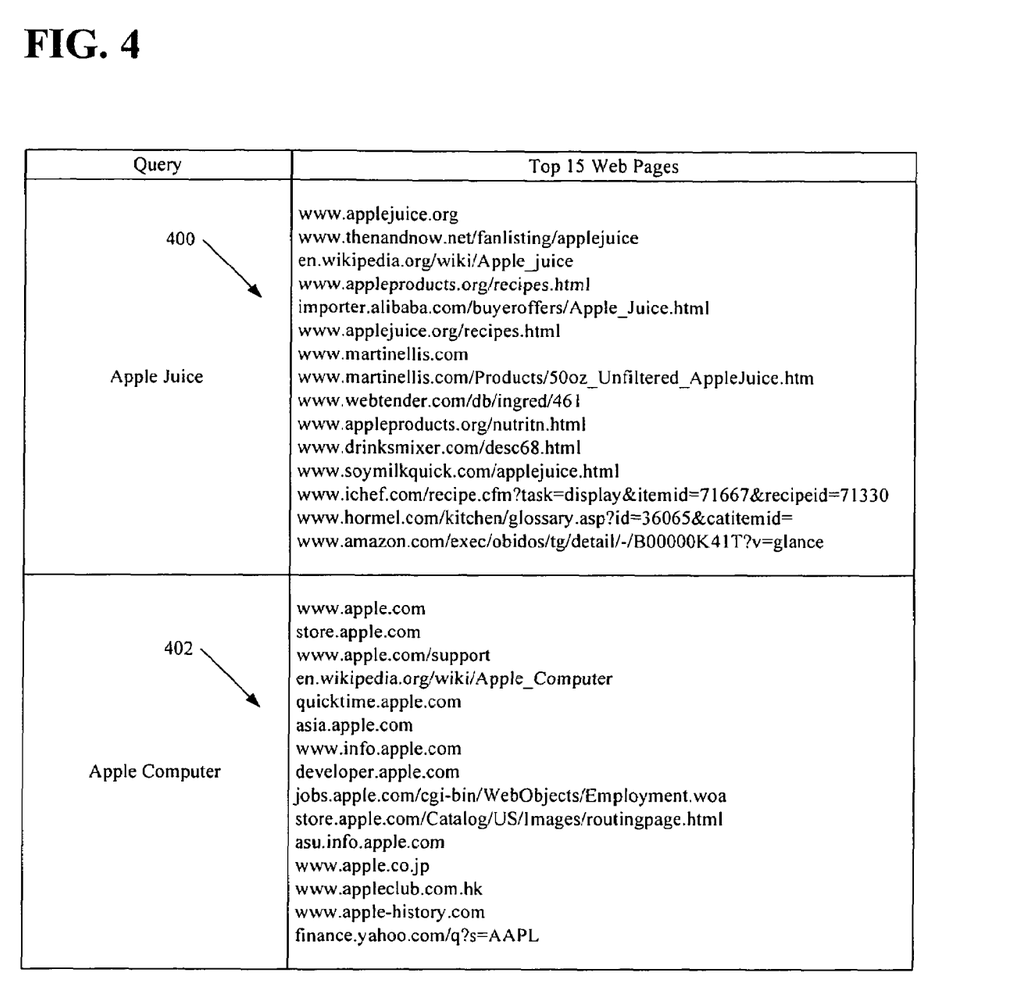
FIG. 4 is a table showing an exemplary search results list for two exemplary search queries.
Figure 5:
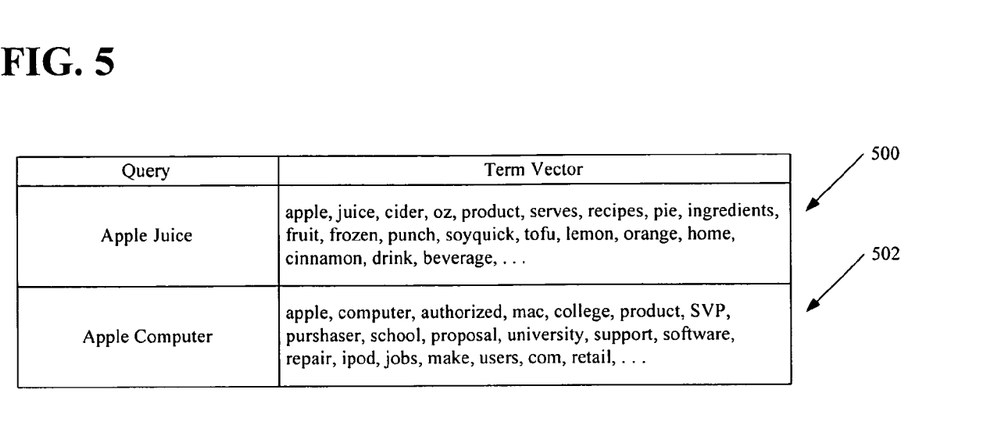
FIG. 5 is a table showing exemplary term vectors.

By way of example, the term vector processor 104 may submit the queries "Apple Juice" and "Apple Computer" to a search engine. The search engine may return a list of relevant search results. FIG. 4 shows an exemplary top fifteen web pages 400, 402 that may be returned by the search engine in response to the two queries. For each Uniform Resource Locator ("URL"), the term vector processor 104 may extract the terms and compute the term vectors 500, 502 shown in FIG. 5. The queries "Apple Juice" and "Apple Computer" may be represented by the term vectors 500, 502. The term vector processor 104 may arrange the terms within the term vectors in order of decreasing term frequencies, although other arrangements, such as alphabetical, query length, etc. may be used. In the example of FIG. 5, the terms are sorted according to the term frequencies in decreasing order and only the top twenty terms with the highest frequencies are shown. As shown, the expanded query representations may better describe the meanings of the queries. Moreover, representing the queries as term vectors allows query similarities to be evaluated by inner product.

The vector space processor 106 is coupled with the term vector processor 104 and computes a vector space as a function of the manually categorized queries and their corresponding term vectors. The vector space processor 106 identifies the unique terms contained within the term vectors and combines the unique terms to create a vector space with x-dimensions, where x is the number of unique terms. The vector space processor 106 may perform morphological tests and/or canonicalization to identify the unique queries, as described above. The vector space processor 106 represents the queries as nodes in the dimensional space, such that the nodes correspond to the terms contained within the corresponding term vector. Each query may therefore be represented as a point in a dimensional vector space. For example, after the term vector processor 104 computes term vectors for each of the 94,415 queries represented in the example of FIG. 3, the vector space processor 106 may compute a vector space with 273,238 dimensions, which corresponds to the number of unique terms in the computed term vectors.

The classifier function processor 108 is coupled with the vector space processor 106 and creates a machine learning classifier function. The classifier function outputs a value that may correspond to a category index number. For example, the value may equal a category index number or approximately equal a category index number, in which case the query may be assumed to belong to the corresponding category. The classifier function computes the value as a function of the query and its term vector. The classifier function processor 108 may use a supervised learning algorithm to create the classifier function. The learning algorithm creates the classifier function as a function of the manually categorized queries, i.e. training data. Each of these queries consists of a plurality of predictor variables, i.e. the term frequencies in the term vectors, and a target variable, i.e. the category index number corresponding to the manually assigned category.

The learning algorithm determines relationships between the predictor variables and the target variables, which are summarized in the classifier function. The classifier function may then be applied to un-categorized queries, i.e. queries that consist of predictor variables but not a target variable, to predict the target variable.

The classifier function processor 108 may use linear regression to create the classifier function, although other learning algorithms may be applied, e.g. Support Vector Machines ("SVM"), naïve bayes, etc. The computations performed by the learning algorithm may become complex due to the number of predictor variables associated with the queries. For example, the vector space processor 106 may create a vector space containing millions of dimensions. In considering the classification problem, if $\{x_i, y_i\}$, i=1, ..., m is the set of training data, where $y_i \in \{1, -1\}$ is the category label of $x_i$, linear regression aims to fit the function:

$$f(x) = a^T x + b, \quad (3)$$

where a is a term vector that corresponds to the number of dimensions in the vector space and b is a constant. The values of $f(x)$ and x correspond to the target variables and the predictor variables of each of queries, respectively. The linear regression algorithm estimates the value of a for the function, such that the residual square sum of square is minimized:

$$RSS(a) = \sum_{i=1}^{m} (f(x_i) - y_i)^2. \quad (4)$$

To simplify, a new element "1" may be appended to each $x_i$. As a result, the constant b may be absorbed into a, which produces:

$$f(x) = a^T x. \quad (5)$$

Let $X = (x_1, \ldots, x_m)$ and $y = (y_1, \ldots, y_m)$, which results in:

$$RSS(a) = (y - X^T a)^T (y - X^T a). \quad (6)$$

Requiring $\partial RSS(a)/\partial a = 0$, results in:

$$a = (XX^T)^{-1} Xy. \quad (7)$$

In this example, the classifier function is represented by equation (5), where a is defined by equation (7). During the training phase, each of the term vectors computed from the training data are input to the classifier function to estimate a value for a for the classifier function. When the number of dimensions (a) is larger than the number of training data (m), overfitting may occur. In such case, the classifier function may not be well defined, i.e. may not output accurate category index numbers. For example, the 94,415 queries represented in the example of FIG. 3 may result in a vector space with 273,238 dimensions. Since the number of queries is far less than the number of dimensions, the situation of overfitting may occur. In order to avoid or limit the effects of overfitting, additional constraints may be introduced to the learning algorithm to regularize the classifier function.

The regularization processor 110 is coupled with the classifier function processor 108 and regularizes the supervised learning algorithm to avoid or limit the effects of overfitting. The regularization processor 110 may perform conventional regularization methods, such as dimensionality reduction, Tikhonov regularization (ridge regression), truncated SVD ("TSVD") regularization, iterative regularization, or other regularization methods. For example, the regularization processor 110 may perform Tikhonov regularization which aims to find a minimum norm minimizer:

$$\min_a (a^T x_i - y_i)^2 + \lambda \|a\|. \tag{8}$$

The optimal solution of Tikhonov regularization may be given by:

$$a = (XX^T + \lambda I)^{-1} Xy, \tag{9}$$

where I is the identity matrix. In this example, the regularized classifier function is represented by equation (5), where a is defined by equation (9). Tikhonov regularization, however, is data independent and may therefore fail to discover the intrinsic structure in the data.

The regularization processor 110 may perform regularization based on search click data. In web search, the search engines may accumulate a large amount of query log data that may be stored in the query log database 112, which may include one or more databases and/or servers. The query log data is derived from queries submitted to a search engine. The query log data is a text or other type of file that stores one or more query records. A query record may be created and/or maintained by a user, e.g. as a function of the user's web browser, and/or a search engine, and may represent the submission of a single query, or set of queries, from a user to a search engine at a specific time, over a range of time, or over a non-consecutive series of time intervals.

The query record contains data relating to the submitted search query. The data may include the query terms exactly as submitted, or variations thereof, user identifying information, a timestamp of when the user submitted the query, search result information generated in response to the query, and/or user activity in relation to the search result information, e.g. clicking on a URL. The user identifying information may contain information gathered from the user's browser program, such as a cookie, the IP address of the host from which the user has submitted the query, or combinations thereof. The query record may also contain other information relating to, for example, the details surrounding the search result information and the user activity, user search restrictions, or other search information.

The regularization processor 110 is coupled with the query log database 112. Based on the query log data, the regularization processor 110 may discover semantic relationships between queries. Among all the queries available in the query log data, let $m_1$ be the number of queries associated with a category index number, and $m_2$ be the number of queries not associated with a category index number. Without loss of generality, let $\{x_i\}_{i=1}^{m_1}$ be the categorized queries and $\{x_i\}_{i=m_1+1}^{m_1+m_2}$ be the un-categorized queries. The semantic relationships may be discovered from the perspective of the search engine users. For example, when a user submits a query x and clicks on a returned web page p, there is reason to suspect that x is relevant top. The strength of the relevance between x and p increases as more users click p while searching x. Let C(x, p) denote the number of clicks of p with respect to query x. It is assumed that if two queries $x_i$ and $x_j$ are both relevant to web page p, then $x_i$ and $x_j$ are relevant to each other. Thus, the similarity between $x_i$ and $x_j$ from the user's perspective can be defined as follows:

$$W_{ij} = \sum_p C(x_i, p) C(x_j, p). \tag{10}$$

The regularization processor 110 may construct a weighted query graph to model the semantic relationship between the queries. The regularization processor 110 may construct the weighted query graph from query log data accumulated over a period of time. In one example, the regularization processor 110 examines query log data for a period of nine months, although other periods of time may be used. The regularization processor 110 represents the queries derived from the query log data as nodes in the weighted query graph. The regularization processor 110 introduces edges between the nodes that are associated with weights. The weights represent the strength of the relation between two nodes, i.e. queries.

Figure 6:
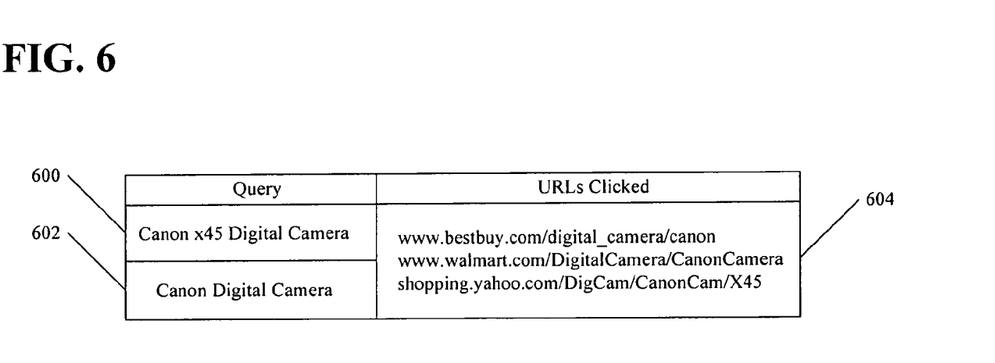
FIG. 6 is a table showing exemplary user click search results for two exemplary search queries.

By way of example, FIG. 6 shows two different queries 600, 602 that, when searched, resulted in at least one user clicking on the same three URLs 604 for both queries. The regularization processor 110 may introduce an edge between the two nodes in the weighted query graph. The regularization processor 110 may determine the number of commonly clicked URLs between the two queries. In this example, the number of commonly clicked URLs 604 equals three. The regularization processor 110 may assign a weight equal to three for the edge between the two nodes. The strength of the relation between the two queries may be directly related to the size of the weight.

The regularization processor 110 assumes that if two queries are similar, as determined by the calculated weight, the values of the function, i.e. the categories of the two queries, should also be similar. The regularization processor 110 maps the weighted query graph to a line such that the related queries stay as close together as possible. A reasonable criterion for choosing a "good" map is to minimize the following:

$$\sum_{ij} (a^T x_i - a^T x_j)^2 W_{ij}, \tag{11}$$

although other criterion may be used. By incorporating this regularizer function into the classifier function, i.e. equation (5), the classifier function may incur a heaving penalty if related queries $x_i$ and $x_j$ are mapped far apart. Thus, minimizing the regularizer function attempts to ensure that if $x_i$ and $x_j$ are related, then the values of $a^T x_i$ and $a^T x_j$ are close.

By incorporating the regularizer into the classifier function, the following is created:

$$V(a) = \sum_{i=1}^{m_1} (a^T x_i - y_i)^2 + \lambda_1 \sum_{i,j=1}^{m} (a^T x_i - a^T x_j)^2 W_{ij} + \lambda_2 \|a\|^2, \tag{12}$$

where $m = m_1 + m_2$. Following several algebraic steps results in the following:

$$\frac{1}{2} \sum_{ij} (a^T x_i - a^T x_j)^2 W_{ij} \tag{13}$$

$$= \sum_i a^T x_i D_{ii} x_i^T a - \sum_{ij} a^T x_i W_{ij} x_j^T a \tag{14}$$

$$= a^T X (D - W) X^T a \tag{15}$$

$$= a^T X L X^T a, \tag{16}$$

where $X=(x_1, \ldots, x_m)$, and D is a diagonal matrix; its entries are column (or row, since W is symmetric) sum of W, $D_{ii}=\Sigma_t W_{ij}$, and L=D−W is the graph Laplacian.

Define $X_1=(x_1, \ldots, x_{m1})$ and $y=(y_1, \ldots, y_{m14})$ where $y_i$ is the category index number of $x_i$. Thus, V(a) can be reduced to the following:

$$V(a)=(y-X_1^T a)^T(y-X_1^T a)+\lambda_1 a^T XLX^T a+\lambda_2 a^T a. \qquad (17)$$

Requiring that the gradient of V(a) vanish gives the following solution:

$$a=(X_1 X_1^T+\lambda_1 XLX^T+\lambda_2 I)^{-1} X_1 y. \qquad (18)$$

In this example, the regularized classifier function is represented by equation (5), where a is defined by equation (18).

Figure 7:
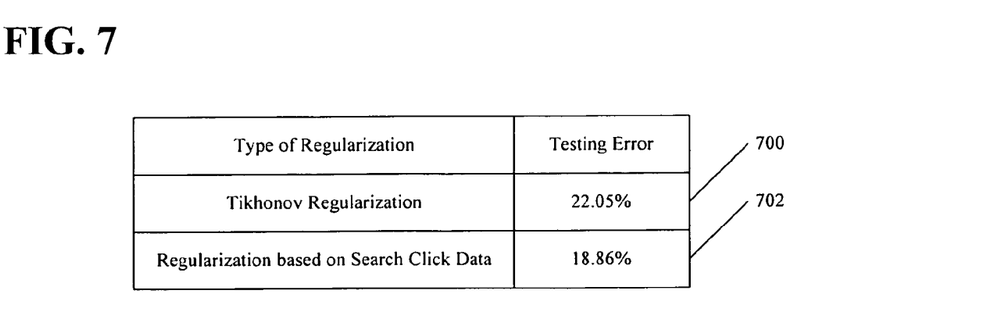
FIG. 7 is a table showing an exemplary query classification accuracy for two exemplary classifier functions.

A portion of the training data may be used as a testing data to measure the classifier function's predictive accuracy, i.e. the ability of the classifier to correctly determine the category index number of an un-categorized query. By way of comparison, FIG. 7 shows the classification results between the classifier function using Tikhonov regularization 700, i.e. equations (5) and (9), and the classifier function using regularization based on search click data 702, i.e. equations (5) and (18). In this example, the training data consists of 80% of the 94,415 queries represented in the example of FIG. 3 and the resulting 273,238 dimensional vector space, and the testing data consists of the remaining 20%, although different percentages may be used. The training and testing data are randomly split. The training data is used to "train" the classifier function, whereas the testing data is used to test the classifier function.

The classification accuracy is defined as the ratio of the number of correct predictions and the total number of predictions. In the foregoing example, the search click data was collected for a single week in order to construct a weighted query graph. As shown by the comparison, the classifier function using regularization based on search click data achieved a 3.19% improvement over the classifier function using Tikhonov regularization. The predictive accuracy of the classifier function may change depending on the amount of training data used to "train" the machine learning function.

Figure 8:
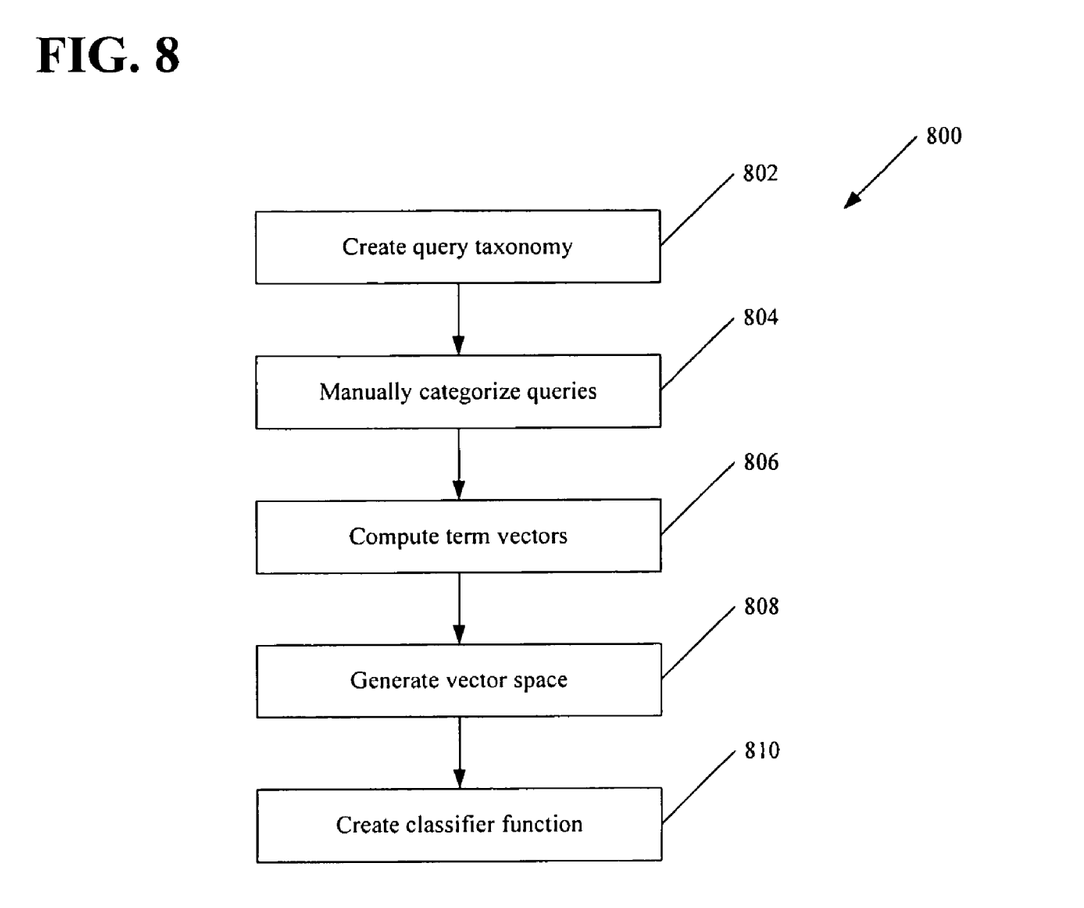
FIG. 8 is a flow chart of one example of creating a classifier function for classifying a search query.

A flow diagram illustrating an exemplary process 800 according to one embodiment is shown in FIG. 8. The process 800 may be implemented for use with the system 100 of FIG. 1 or a different system. The process 800 begins with the creation of a query taxonomy for classifying queries, represented by block 802. The taxonomy may contain a plurality of hierarchies and a plurality of categories within the hierarchies. The hierarchies may be arranged in order of decreasing specificity. The process 800 proceeds to block 804 where a plurality of selected queries is manually categorized in the query taxonomy. The selected queries may be selected randomly, or according to one or more criterion including frequency, variety, specificity, length, etc. The queries may be categorized in the query taxonomy by associating a category that matches the query's subject matter, meaning, context in which the query may be submitted, assumed user intent behind the query, or other categorization criterion. The queries are used by the process 800 as training data.

The process 800 proceeds to block 806 where term vectors are computed for the queries. The queries may be submitted to a search engine where a number of returned search results are identified. The terms contained within the search results may be extracted and their frequencies may be computed. Each of the identified web pages may be represented as a term vector. The term vectors may be normalized and summed to generate a term vector that represents each query. The process 800 proceeds to block 806 where the term vectors are combined to generate a dimensional vector space as a function of the number of unique terms contained within the term vectors. The queries may be plotted as nodes in the vector space. The process 800 proceeds to block 810 where the classifier function is created. The classifier function may be created by a supervised learning algorithm. Each of the term vectors for the queries selected as training data may be incorporated into the learning algorithm to estimate a value for the function. The function may be applied to un-categorized queries, e.g. queries submitted by search engine users, to determine a classification for the queries.

Figure 9:
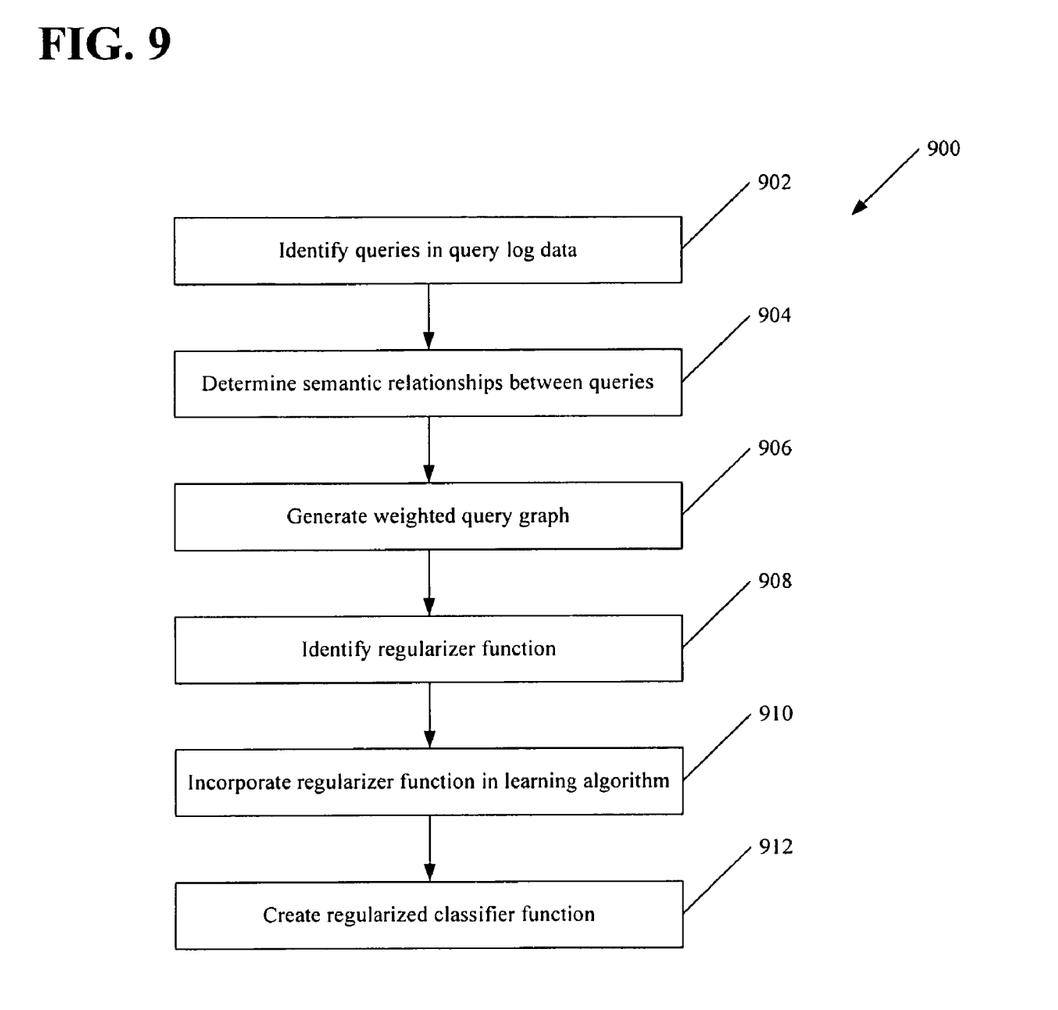
FIG. 9 is a flow chart of one example of creating a regularized query classification function as a function of search click data.

A flow diagram illustrating an exemplary process 900 for creating a regularized query classification function is shown in FIG. 9. The process 900 may be implemented for use with the system 100 of FIG. 1 or a different system. The process 900 begins with the identification of categorized and un-categorized queries contained within query log data, represented by block 902. The process 900 may analyze query log data generated from one or more search engines and for any period of time in order to identify the queries. The process 900 proceeds to block 904 where semantic relationships are determined between the identified queries. In one embodiment, the semantic relationships are determined as a function of user actions. The process 900 assumes that if a user submits a query to a search engine and clicks a returned web page, the query and the web page are related. The process 900 also assumes that if two queries are related to a returned web page, the queries are related to each other. The process 900 proceeds to block 906 where a weighted query graph is generated. The weighted query graph represents the semantic relationships. The process 900 may represent the identified queries as nodes and construct edges between the nodes as a function of the strength of the semantic relationship between the queries, e.g. the edge may be given a weight that represents the number of similar web pages clicked by users searching the two queries.

The process 900 proceeds to block 908 where a regularizer function is identified. The regularizer function attempts to preserve the semantic relationships between the queries. For example, if the weighted query graph has an edge between two nodes, the queries of those two nodes are similar and the values of the classifier function, i.e. the categories of the two queries, should also be similar. The process 900 proceeds to block 908 where the regularizer function is incorporated into the learning algorithm used to create the classifier function. The regularizer function attempts to eliminate or limit the effects of overfitting that may occur when the number of dimensions exceeds the number of queries in the training data set. The process 900 proceeds to block 912 where the regularized classifier function is created.

Figure 10:
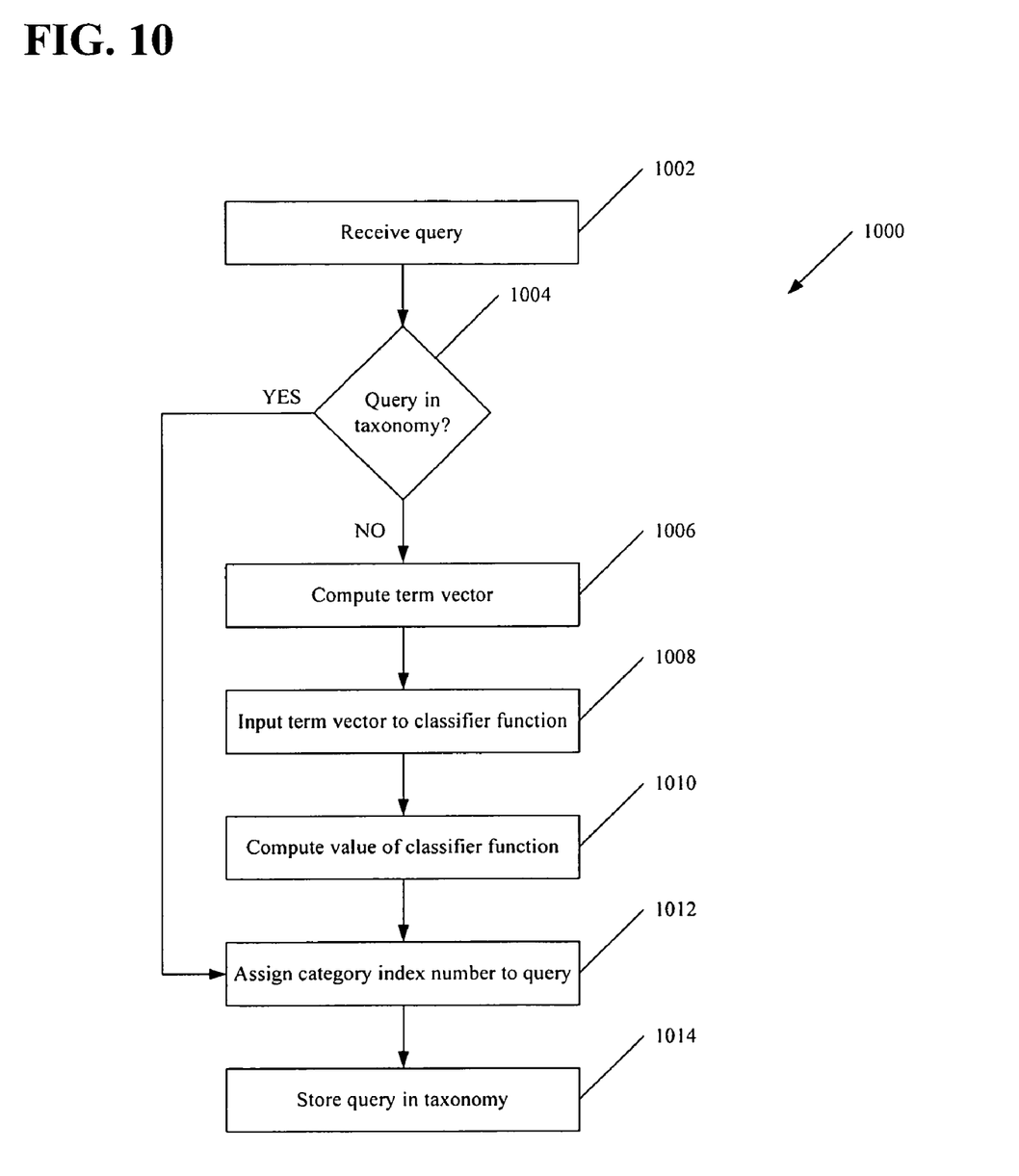
FIG. 10 is a flow chart of one example of classifying a search query.

A flow diagram illustrating an exemplary process 1000 for classifying an un-categorized query based on a classifier function is shown in FIG. 10. The process 1000 may be implemented for use with the system 100 of FIG. 1 or a different system. The process 1000 begins with the receipt of a query, represented by block 1002. The query may be submitted to a search engine and passed to the system 1000 by a program, process, or other system that identifies the query and passes it to the system 1000. The system 1000 may also be operating in conjunction with the search engine and may receive the query as the query is submitted to the search engine. Other methods of passing the query to the system 1000 may be used. The process 1000 proceeds to decision block 1004 where it is determined if the query or one or more terms present in the query have previously been classified. For example, the query may match a query that was selected as training data. The query may also have been previously classified and stored by process 1000.

If the query or a portion of the query has already been classified, then the process branches to block 1012 where the appropriate category index number is assigned to the query. If the query has not been classified, the process 1000 proceeds to block 1006 where the term vector for the query is computed. The term vector may be computed as described herein. The process 1000 proceeds to block 1008 where the term vector is input in the classifier function. The process 1000 proceeds to block 1010 where the value of the classifier function is computed. The value of the classifier function may correspond to the category index level of a category within the query taxonomy. The process 1000 proceeds to block 1012 where the category index number is assigned to the query. For example, if the value computed by the classifier function equals or approximately equals a category index number, the query is assigned the category index number. If the value computed by the classifier function does not equal or approximately equal a category index number, then the query may not belong in any of the categories and no category index number may be assigned. The process 1000 proceeds to block 1014 where the query is stored in the taxonomy according to the assigned category index number.

A system for classifying a search query includes computer programming logic stored in a memory and executable by a processor coupled with the memory. The computer programming logic includes first logic operative to compute term vectors as a function of categorized search queries in a query taxonomy; second logic coupled with the first logic and operative to generate a vector space as a function of the term vectors; third logic coupled with the second logic and operative to create a classifier function as a function of the vector space; fourth logic coupled with the third logic and operative to classify an uncategorized search query as a function of the classifier function; and fifth logic coupled with the third logic and operative to regularize the classifier function.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method of classifying a search query with a computer having a processor, the method comprising:
    categorizing, by the processor, a plurality of selected search queries;
    storing the categorized search queries in a taxonomy database according to category, the taxonomy database being stored in a data storage system coupled with the processor;
    storing in a query log database query log data derived from the plurality of categorized search queries submitted to one or more search engines and including user click data, wherein the query log database is stored in the data storage system and is coupled with the processor;
    computing, by the processor, a term vector for each of the plurality of selected search queries as a function of a web search, wherein the data storage system is operable to store the term vectors;
    creating, by the processor, a classifier function as a function of the computing the term vectors, wherein the data storage system is operable to store the classifier function;
    regularizing, by the processor, the classifier function based on the query log data comprising:
        constructing a weighted query graph including nodes that represent the plurality of categorized search queries to model semantic relationships therebetween based on the query log data; and
        mapping the weighted query graph to a line such that related queries are located close to each other within the weighted query graph; and
    classifying, by the processor, an un-categorized search query as a function of the regularized classifier function.

2. The method of claim 1 wherein the plurality of selected search queries comprises a plurality of search queries selected according to at least one of a query frequency, variety, specificity, length, or combinations thereof.

3. The method of claim 1 wherein the categorizing comprises:
    manually categorizing the selected search queries in a query taxonomy.

4. The method of claim 1 wherein the computing comprises:
    submitting each of the plurality of selected search queries to a search engine;
    identifying one or more returned web pages for each of the plurality of selected search queries; and
    computing the term vector for each of the plurality of selected search queries as a function of terms extracted from the one or more returned web pages.

5. The method of claim 1 wherein the classifier function comprises a supervised learning algorithm.

6. The method of claim 1 wherein the un-categorized search query comprises a search query submitted to a search engine by a user.

7. The method of claim 1 wherein the classifying comprises:
    computing a term vector for the un-categorized search query as a function of a web search; and
    classifying the un-categorized search query as a function of the regularized classifier function.

8. The method of claim 1 further comprising:
    storing the un-categorized search query in the query taxonomy database as a function of the classifying.

9. The method of claim 1 further comprising creating a dimensional vector space as a function of the term vectors, wherein the classifier function is given by $f(x)=a^T x$ where $f(x)$ and $x$ correspond to target variables and predictor variables of the plurality of selected search queries, respectively, and where $a$ is a term vector corresponding to a number of dimensions of the dimensional vector space.

10. The method of claim 9 further comprising minimizing a regularizer function by setting a as $(X_1 X_1^T + \lambda_1 X L X^T + \lambda_2 I)^{-1} X_1 y$ where I is the identity matrix, $X=(x_1, \ldots, x_m)$, $X_1 = (x_1, \ldots, x_{m1})$, $y=(y_1, \ldots, y_{m1})$ where $y_i$ is a category index number of $X_i$, and $L=D-W$ where W represents the similarity between the un-categorized search query and the categorized search queries within the dimensional vector space based on the query log data and D represents a diagonal matrix with entries being the column sum of W.

11. A system for creating a regularized classifier function for classifying a search query comprising:
    a taxonomy database operable to store a plurality of categorized search queries wherein the taxonomy database is stored in a data storage system;
    a term vector processor coupled with the taxonomy database and operable to create term vectors for each of the plurality of categorized search queries as a function of a web search, wherein the data storage system is operable to store the term vectors and is coupled with the term vector processor;
    a classifier function processor coupled with the term vector processor and operable to create a classifier function as a function of the term vectors, wherein the data storage system is operable to store the classifier function and is coupled with the classifier function processor;

a query log database containing query log data derived from the plurality of categorized search queries submitted to one or more search engines and including user click data, wherein the query log database is stored in the data storage system; and a regularization processor coupled with the classifier function processor and the data storage system, the regularization processor operable to regularize the classifier function by:

constructing a weighted query graph including nodes that represent the plurality of categorized search queries to model semantic relationships therebetween based on the query log data; and regularizing the machine learning classifier function based on the query log data by mapping the weighted query graph to a line such that related queries are located close to each other within the weighted query graph.

12. The system of claim 11 wherein the taxonomy database comprises a query taxonomy.

13. The system of claim 11 wherein the term vector processor is operable to:

submit each of the plurality of categorized search queries to a search engine;

extract terms located within one or more returned web pages corresponding to each of the plurality of categorized search queries; and create the term vectors for each of the plurality of categorized search queries as a function of the terms.

14. The system of claim 11 wherein the classifier function processor comprises a machine learning function operable to create the classifier function.

15. The system of claim 11 wherein the query weight graph comprises at least one edge connecting two search queries, and wherein the edge represents a relationship between the two search queries.

16. The system of claim 11 further comprising a vector space processor coupled with the term vector processor and operable to create a dimensional vector space as a function of the term vectors.

17. The system of claim 16 wherein the classifier function is given by $f(x)=a^T x$ where $f(x)$ and x correspond to target variables and predictor variables of the plurality of selected search queries, respectively, and where a is a term vector corresponding to a number of dimensions of the dimensional vector space.

18. The system of claim 17 wherein the classifier function processor classifies an un-categorized search query as a function of the regularized classifier function, and the regularization processor minimizes a regularizer function by setting a as $(X_1 X_1^T + \lambda_1 XLX^T + \lambda_2 I)^{-1} X_1 y$ where I is the identity matrix, $X=(x_1, \ldots, x_m)$, $X_1=(x_1, \ldots, x_{m1})$, $y=(y_1, \ldots, y_{m1})$ where $y_i$ is a category index number of $x_i$, and $L=D-W$ where W represents the similarity between the un-categorized search query and the categorized search queries within the dimensional vector space based on the query log data and D represents a diagonal matrix with entries being the column sum of W.

19. A system for classifying a search query comprising computer programming logic stored in a memory and executable by a processor coupled with the memory, the computer programming logic comprising:

first logic operative to compute term vectors as a function of categorized search queries in a query taxonomy;

second logic coupled with the first logic and operative to generate a vector space as a function of the term vectors;

third logic coupled with the second logic and operative to create a classifier function as a function of the vector space;

fourth logic coupled with the third logic and operative to regularize the classifier function, wherein the fourth logic:

constructs a weighted query graph including nodes that represent the categorized search queries to model semantic relationships therebetween based on query log data derived from submission of the categorized search queries to one or more search engines and including user click data; and regularizes the classifier function based on the query log data by mapping the weighted query graph to a line such that related queries are located close to each other within the weighted query graph; and fifth logic coupled with the fourth logic and operative to classify an un-categorized search query as a function of the regularized classifier function.

20. The system of claim 19 wherein the categorized search queries comprise training data operative to train the classifier function.

21. The system of claim 19 wherein the fifth logic is further operative to store the un-categorized search query in a taxonomy database as a function of the classification.

* * * * *